United States Patent [19]
McCarthy et al.

[11] Patent Number: 5,211,078
[45] Date of Patent: May 18, 1993

[54] REMOVABLE GEAR SHIFT LEVER

[75] Inventors: William D. McCarthy, Islip; Kevin P. Boydston, Holbrook, both of N.Y.

[73] Assignee: Global Decisions, Inc., East Islip, N.Y.

[21] Appl. No.: 882,448

[22] Filed: May 12, 1992

[51] Int. Cl.$^5$ .............................................. B60K 20/00
[52] U.S. Cl. ................................... 74/850; 70/204; 70/245; 74/473 R; 74/473 SW; 74/524; 74/878; 180/272
[58] Field of Search ................. 70/204, 245, 246, 247; 74/473 R, 475, 523, 524, 525, 878, 850, 473 SW; 180/272, 287

[56] References Cited
U.S. PATENT DOCUMENTS

| | | | |
|---|---|---|---|
| 1,398,455 | 11/1921 | De Clairmont | 70/201 |
| 1,522,740 | 1/1925 | Nosser | 70/248 |
| 1,541,021 | 6/1925 | Bachle | 70/251 |
| 1,681,017 | 8/1928 | Smith | 70/251 |
| 1,694,011 | 12/1928 | Hosford | 70/204 |
| 1,694,863 | 12/1928 | Prigge | 70/251 |
| 1,725,003 | 8/1929 | Johnson | 70/254 |
| 1,752,968 | 4/1930 | Smith | 70/204 |
| 2,024,641 | 12/1935 | Hemingway, Jr. | 70/128 |
| 2,293,197 | 8/1942 | Dorr | 70/204 |
| 3,564,878 | 2/1971 | Seatts | 70/247 X |
| 3,732,746 | 5/1973 | Fitzpatrick | 74/523 X |
| 3,858,055 | 12/1974 | Tregurtha | 307/10 |
| 3,865,500 | 2/1975 | Newell | 403/359 |
| 3,990,550 | 11/1976 | Recker | 192/46 |
| 3,994,183 | 11/1976 | Markl | 180/287 X |
| 4,281,526 | 8/1981 | Lipschutz | 70/202 |
| 4,513,276 | 4/1985 | Kubota et al. | 74/475 X |
| 4,541,257 | 9/1985 | Stoll | 74/523 X |
| 4,612,820 | 9/1986 | Behrens | 74/475 |
| 4,662,775 | 5/1987 | Faul | 403/365 |
| 4,728,218 | 3/1988 | Durham | 403/319 |
| 4,819,402 | 4/1989 | Schneider | 52/726 |
| 4,881,389 | 11/1989 | Alfon et al. | 70/209 |

FOREIGN PATENT DOCUMENTS

| | | | |
|---|---|---|---|
| 2700976 | 7/1978 | Fed. Rep. of Germany | 70/247 |
| 2590857 | 6/1987 | France | 70/247 |

Primary Examiner—Allan D. Herrmann
Assistant Examiner—David W. Laub
Attorney, Agent, or Firm—Robin, Blecker, Daley & Driscoll

[57] ABSTRACT

A gear shift lever assembly is disclosed wherein the assembly comprises a gear shift lever which is adapted to engage a gear shift mechanism of a vehicle and in which a further mechanism is provided to allow the gear shift lever to be attached and released from the gear shift mechanism only in positions in which the vehicle cannot be driven of its own power.

28 Claims, 7 Drawing Sheets

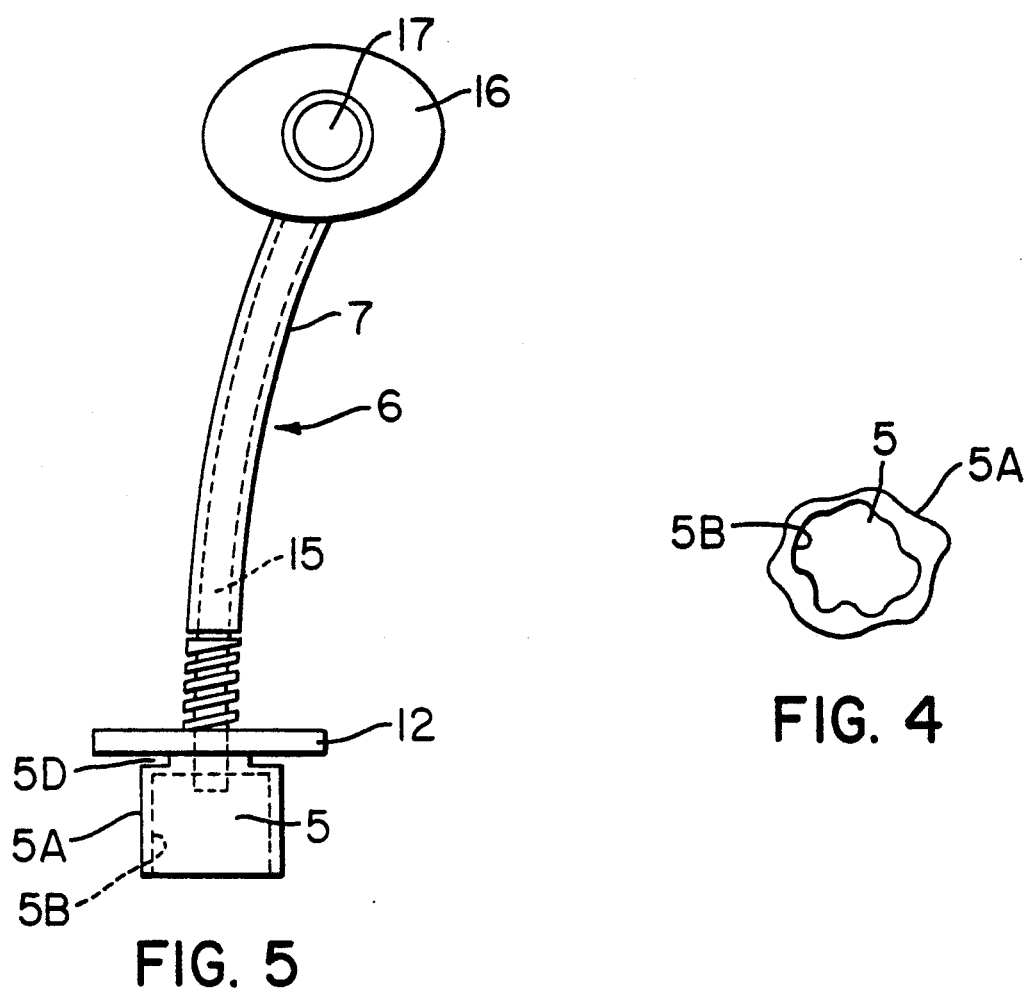

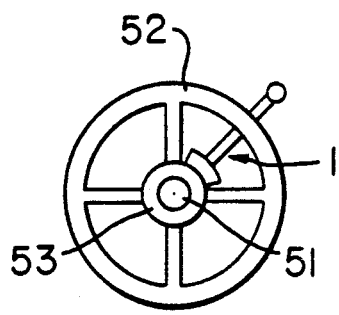
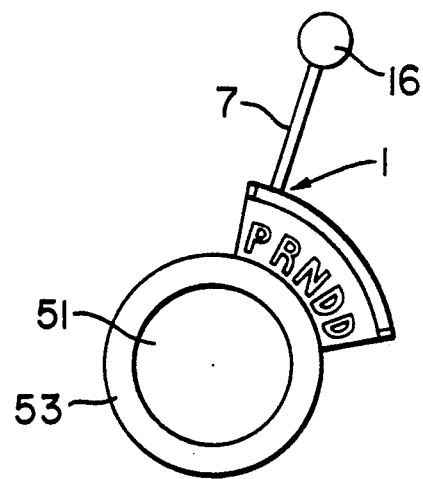
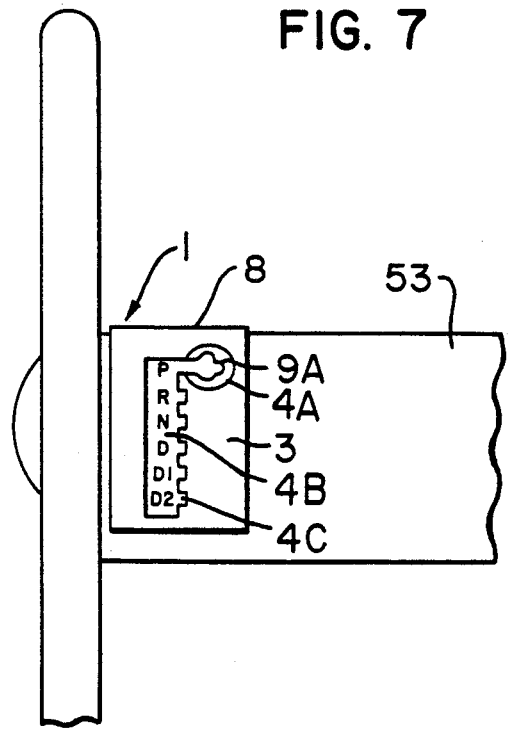
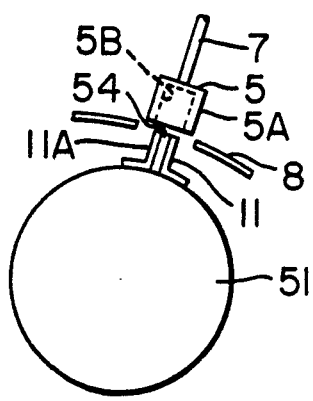
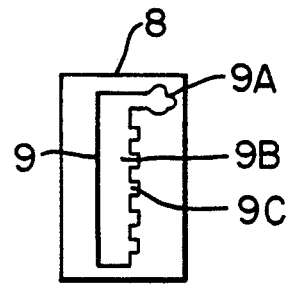
FIG. 6
FIG. 7
FIG. 8
FIG. 9
FIG. 10

REMOVABLE GEAR SHIFT LEVER

BACKGROUND OF THE INVENTION

This invention relates to gear shift lever assemblies for vehicles and, in particular, to gear shift lever assemblies adapted to prevent theft of vehicles.

The problem of vehicle theft in the United States and elsewhere is a significant one. This has led to a variety of devices which attempt make theft more difficult. Some of these devices comprise expensive electronic systems such as, for example, electronic alarm systems, which are incorporated into a vehicle and which sound an alarm when unauthorized attempts are made to enter the vehicle. Others of these devices are less costly mechanical devices such as, for example, steering wheel collars or crook locks which lock parts of the vehicle and prevent their use unless unlocked by an authorized person having a key.

Another type of mechanical device which has been proposed is a removable gear shift lever. This type of device allows you to remove the vehicle gear shift lever from the vehicle when it is unattended. As a result, a potential thief not seeing the gear shift lever will be less likely to attempt to steal the vehicle. Also, the absence of the gear shift lever makes it much more difficult for a thief to steal the vehicle, even if the thief is not deterred by visually observing that the gear shift is not present.

Removable gear shift levers are disclosed in a number of prior art patents. U.S. Pat. No. 1,398,455 discloses a gear shift lever in which the lower end of the gear shift lever is modified so as to be removably engageable with a suitably adapted end of the automobile gear shift mechanism. In one form of the gear shift lever of the '455 patent, the lower end of the lever is a solid shaft provided with a lug. The latter is then engageable with a bayonet slot of a tubular shaft in the gear shift mechanism. In other forms of this device, the shaft of the gear shift mechanism is formed as a rod. In one case, the lower end of the gear shift lever is made tubular so as to tightly fit around this rod. In another case, the rod is externally threaded and the tubular end of the lever is internally threaded so that the lever can be screwed onto the externally threaded rod.

U.S. Pat. No. 2,293,197 discloses another type of gear shift lever assembly in which the gear shift lever is screwed into a support member which can be detachably mounted to a part of a gear shift mechanism. In this gear shift assembly, the support member comprises a first part which is welded to the gear shift mechanism and a second part which carries the gear shift lever. This second part also carries a lock which can be locked and unlocked with a key to attach and detach the second part and, therefore, the gear shift lever from the first part. This allows the gear shift lever to be removed from the vehicle.

In U.S. Pat. No. 3,564,878 a further type of removable gear shift lever assembly is described in which one end of the gear shift lever is provided with a key which is followed by a threaded cylindrical surface and a tapered cylindrical surface. In this case, the shift column of the gear shift mechanism of the vehicle is provided with a threaded cylindrical hole followed by a cavity which carries a cylindrical lock. A cover plate covers the shift column and has a tapered bore which aligns with the threaded cylindrical hole. The gear shift mechanism also has, internal of the shift column, a rotatable member having an aperture which aligns with the cylindrical lock.

With this gear shift assembly, the key end of the gear shift lever is inserted through the tapered bore of the cover plate and through the threaded cylindrical surface of the shift column to engage the cylindrical lock. At this position, the threaded cylindrical surface and the tapered cylindrical surface of the lever engage the threaded hole of the shift column and the tapered bore of the cover plate, respectively. Rotation of the lever then causes the key to rotate the cylindrical lock, thereby allowing its cylindrical plug to enter the associated aperture in rotatable member of the gear shift mechanism. In this way, the gear shift lever is held to the column so that movement of the lever allows shifting of the gear shift mechanism. By rotation of the gear shift lever in the opposite direction, the lever is removed from the shift column.

The above-described removable gear shift levers have certain characteristics which detract from their usefulness. In particular, each is such that the gear shift lever can be removed in any shift position of the automobile. This can occur with the levers of the '455 and '878 patents by rotating the levers to disengage them from the gear shift mechanism. In the lever of the '197 patent, on the other hand, the key can be used to unlock the second part of the support member to detach this member and, hence, the gear shift lever.

As a result, it is possible to remove each of these levers when in a shift position in which the vehicle can move. This tends to compromise the safety of the vehicles in which the levers are used. Also, in the gear shift levers of '197 and '878 patents locks are required, making these levers overly complicated and expensive.

It is, therefore, an object of the present invention to provide a removable vehicle gear shift lever assembly which does not suffer from the above drawbacks.

It is a further object of the present invention to provide a removable vehicle gear shift lever assembly in which the assembly can be more safely used.

It is yet a further object of the present invention to provide a removable vehicle gear shift lever assembly which is secure without the need of expensive locks.

SUMMARY OF THE INVENTION

In accordance with the principles of the present invention the above and other objectives are realized in a vehicle gear shift lever assembly which includes a gear shift lever which is adapted to engage a gear shift mechanism of a vehicle and which further includes means adapted to cooperate with the gear shift lever to allow the gear shift lever to be non-releasably maintained in engagement with the gear shift mechanism in all positions of the mechanism in which the vehicle can move under power of its engine and to be releasably maintained in engagement with the gear shift mechanism in at least one position of the gear shift mechanism in which the vehicle cannot move under power of its engine. In this way, the gear shift lever can only be released from the gear shift mechanism when the automobile is incapable of moving under power, whereby the removable gear shift assembly can be more safely used.

In the embodiment of the invention to be disclosed hereinafter, the cooperating means is in the form of a plate which is securable to the vehicle and which is such that a first end of the gear shift lever must fit through a slot in the plate in order to engage the gear shift mechanism. The slot of the plate is configured such that it allows passage of the first end of the gear shift lever only at a preselected position or positions. This position or these positions, in turn, align with the position or positions of the gear shift mechanism in which the vehicle cannot be moved under power of its engine. As a result, the plate permits the gear shift lever to be attached to and released from the gear shift mechanism only at these non-moving vehicle positions.

In a further aspect of the invention and as provided in the disclosed embodiment, the outer surface of the first end of the gear shift lever and the slot of the plate, at the preselected position or positions have first and second preselected complimentary or keyed configurations. As a result, only a gear shift lever having a first end with the first preselected configuration can be passed through the plate to engage the gear shift mechanism.

In yet a further aspect of the invention, the first end of the gear shift lever is additionally adapted so as to have a preselected complimentary or keyed relationship with an adapter which engages the part of the gear shift mechanism to be engaged by the gear shift lever. This is accomplished by adapting a part of the first end of the gear shift lever and the adapter to have third and fourth complimentary or keyed configurations. As a result, only a gear shift lever whose first end has a part having this third preselected configuration can suitably engage the gear shift mechanism.

In still further aspects of the invention, the gear shift lever assembly is also adapted to provide an interlock for the starting circuit of the vehicle and a plug member is disclosed which prevents access to the gear shift mechanism when the gear shift lever is removed.

BRIEF DESCRIPTION OF THE DRAWINGS

The above and other features and aspects of the present invention will become more apparent upon reading the following detailed description in conjunction with the accompanying drawings, in which:

FIG. 4 shows an end view of one end of the gear shift lever of the gear shift lever assembly of FIG. 1;

FIG. 5 shows a full view of the gear shift lever of the gear shift assembly of FIG. 1;

FIGS. 6-10 show the vehicle gear shift lever assembly of FIGS. 1-5 used with a column mounted gear shift mechanism;

DETAILED DESCRIPTION

Figure 1:
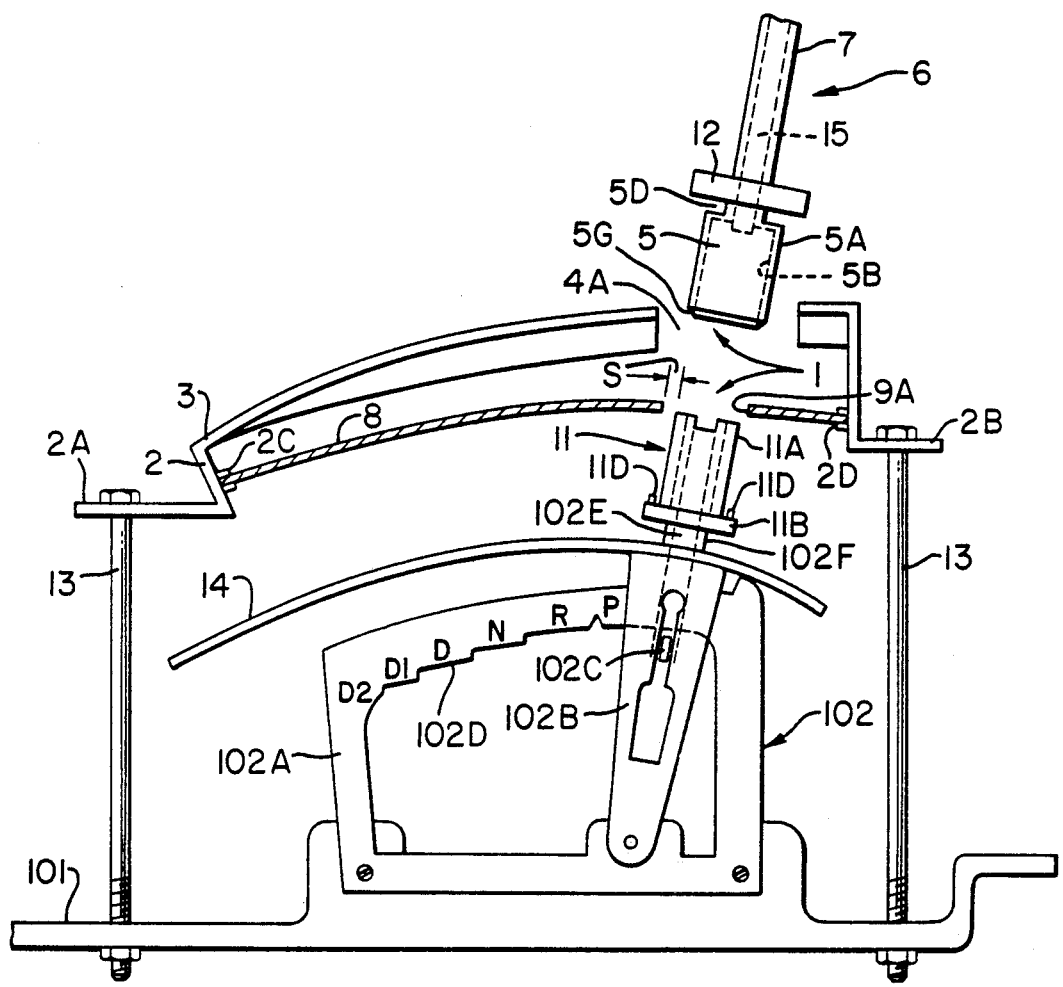
FIG. 1 shows schematically a vehicle gear shift lever assembly in accordance with the principles of the present invention.

FIG. 1 shows schematically a gear shift lever assembly 1 in accordance with the principles of the present invention. As shown, the assembly 1 is being used with an automobile or vehicle 101 whose gear shift mechanism 102 is floor mounted. The gear shift mechanism 102 includes a support housing 102A which supports a pivot arm 102B. The pivot arm 102B can be pivoted to several positions and locked in place by spring loaded slide or latch 102C. The latch 102C is biased to engage a stepped locking surface 102D of the support housing 102A.

A pin 102E is spring mounted within the bore of a hollow rod 102F which is connected to the arm 102B. The pin 102E is biased upward and in response to a downward force moves downward engaging and moving the latch 102C downward. This disengages the latch 102C from the surface 102D permitting the arm 102B to be rotated to different steps of the surface. Rotation of the arm 102B, in turn, shifts the gear shift mechanism 102, allowing the vehicle 101 to be placed in different gears.

It is assumed that the position of the arm 102B shown in FIG. 1 corresponds to the park position (P) of the vehicle. It is further assumed that subsequent positions of the arm when pivoted in the counterclockwise direction and locked to increasing height steps of the surface 102D correspond to the reverse (R), neutral (N), drive (D), drive one (D1) and drive two (D2) gear positions of the vehicle. As can be appreciated, the park and neutral positions of the arm 102B place the vehicle, via the gear shift mechanism 102, into gears in which the vehicle is not being driven by the vehicle motor and, therefore, cannot be moved of its own power.

Figure 2:
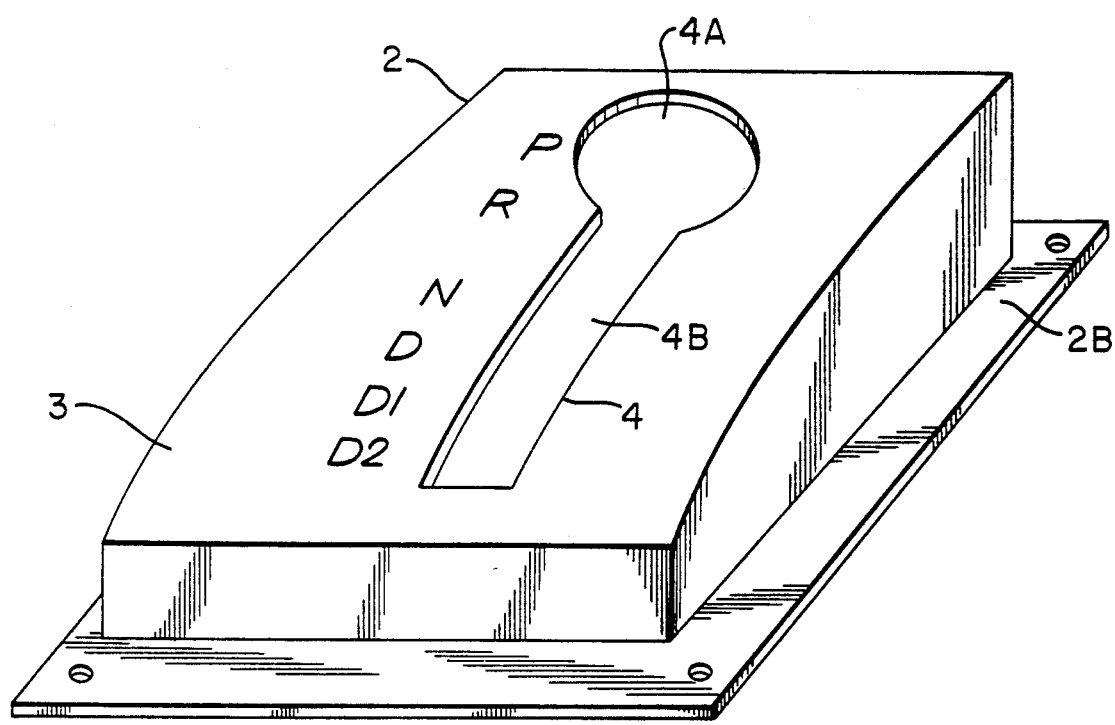
FIG. 2 shows the housing unit of the vehicle gear shift lever assembly of FIG. 1.

A boot or housing 2 of the gear shift assembly 1 is mounted on or to the vehicle 101 over the gear shift mechanism 102. This is accomplished via bolts 13 which engage borders 2A and 2B of the housing 2. This is accomplished via bolts 13 which engage borders 2A and 2B of the housing 2. The housing 2 has a top wall 3 which includes a slot (see FIG. 2) having an enlarged end portion 4A through which the lower end 5 of a gear shift lever 6 of the gear shift assembly 1 can pass to engage the gear shift mechanism 102. As will be made clear below, when the gear shift lever 6 is so engaged, its end 5 is entirely below the slot 4 so that the upper smaller-diameter rod portion 7 of the gear shift lever lies within the enlarged slot portion 4A. Since the diameter of the rod portion 7 is made slightly less than the width of the narrow portion 4B of the slot 4, the slot does not obstruct movement of the lever 6 when it is used to shift the gear shift mechanism 102.

In accordance with the principles of the present invention, the gear shift assembly 1 is further adapted so as to permit the gear shift lever 6 to be in releasable engagement with the gear shift mechanism 102 only in a position or positions of the gear shift mechanism in which the vehicle cannot be driven under its own power. In the case shown, this is accomplished by adapting the assembly 1 so that the gear shift lever 6 can engage and be released from the gear shift mechanism 102 only in the park position of the gear shift mechanism. By this is meant that the gear shift lever 6 in positions other than the park position of the gear shift mechanism can only be removed from the gear shift mechanism by damaging or destroying the housing 2 and/or by removal of the housing 2 via unscrewing the screws 13, none of which are intended ways for removal of the lever which in the park position can be removed merely by pulling the lever upward and out of the housing.

In the particular embodiment illustrated, a key plate 8 is mounted between slotted mounts 2C and 2D arranged on the inner walls of the housing 2 below the top wall 3.

This places the key plate in the path of the end 5 of the gear shift lever 6 leading to the gear shift mechanism 2. The key plate 8 includes a slot 9 (see, FIG. 3) having a position 9A at which the slot is enlarged and has a first preselected configuration. The position 9A is chosen so that it is below the enlarged slot portion 4A of the top wall 3 of the housing 2 and, hence, in alignment with the position of the arm 102B when it places the gear shift mechanism 102 in the park position.

The outer wall 5A of the lower end 5 of the gear shift lever 6, in turn, has a second preselected configuration which is complimentary or keyed to the first preselected configuration of the slot 9 at the position 9A. As a result, the gear shift lever end 5 is allowed to pass through the slot 9 of key plate 8 only in the park position of gear shift mechanism 102. The gear shift lever 6 can, thus, be attached to and released from the gear shift mechanism only in this position.

Moreover, only a gear shift lever having an end 5 with the first preselected configuration and, hence, complimentary to the second preselected configuration of the slot portion 9A, will properly pass through the key plate. This results in a gear shift lever assembly 1 which can be safely used, since it can only be released from the gear shift mechanism when it is in a position in which the vehicle cannot move under its own engine power. It also results in a gear shift lever having a degree of security, due to the keyed relationship of the surface 5A of the lever and the walls of the slot portion 9A of the key plate.

Figure 3:
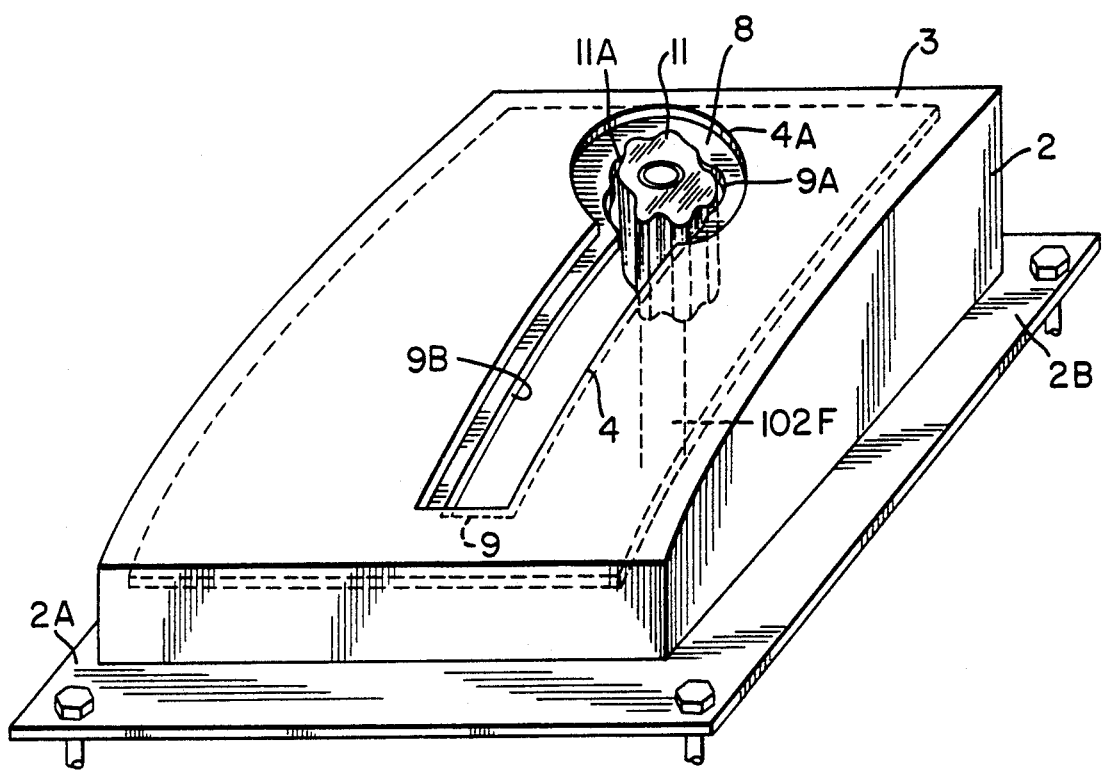
FIG. 3 shows the housing and key plate of the gear shift lever assembly of FIG. 1.

In the case shown, the surface 5A has a preselected fluted configuration as shown by the end view in FIG. 4. The slot 9 at the position 9A thus has a fluted configuration complimentary to that of the surface 5A, as can be seen in FIG. 3.

In order to provide enhanced security to the gear shift lever assembly 1, the assembly is provided with a further complimentary or keyed relationship which must also be satisfied in order for the gear shift lever assembly 1 to be attached to the gear shift mechanism 102. This second relationship is realized by including in the assembly 1 a hollow adapter 11 which is mounted over the upper end of the rod 102F of the gear shift mechanism 102.

The adapter 11 has an outer surface 11A which has a preselected third configuration which is complimentary or keyed to a preselected fourth configuration of the inner surface 5B of the end 5 of the gear shift lever 6. As a result, only a lever arm having this preselected fourth configuration will now be able to properly engage the adapter 11 and, hence, the gear shift mechanism 102. As above-indicated, this further keyed relationship between the adapter 11 and inner surface 5A of the gear shift lever end 5 provides a second element of security to the gear shift assembly 1.

As shown in FIG. 4, the inner surface 5B of the lever end 5 is fluted to realize the third preselected configuration. Likewise, the outer surface 11A of the adapter 11 (see, FIG. 3) is fluted in complimentary fashion to the inner surface 5B to realize the desired keyed relationship.

In order to further enhance the security provided by the pairs of complimentary surfaces 5A, 9A and 5B, 11A, the spacing S between the walls of slot portion 9A and the surface 11A of the adapter 11 can be made small and held to close tolerances. This makes it much more difficult to defeat the doubled keyed relationship with a hollow shaft or like device.

In order to permit the gear assembly 1 to properly rotate the arm 102B when the end 5 is seated on the adapter 11, the upper portion of the end 5 is slotted at 5D. This slotted portion is of a diameter sufficient to just fit within the narrow portion 9B of the key slot 9. As a result, movement of the gear shift lever from the park position can occur without obstruction by the key plate 8.

An enlarged diameter shoulder 12 is also provided on the gear shift lever 6 between the end 5 and the rod 7. The edges of the key slot 9 of the key plate 8 are thus situated between the surface of the slot 5D and the bottom surface of the shoulder 12. This provides a positive guiding influence to the gear shift lever 6 when it is moved to the different shift positions.

Also, a flange 11B is included at the bottom end of the adapter 11. This flange provides a lower seating surface for the lower end 5 of the gear shift lever 6 so that the end 5 is properly positioned with its slot 5D aligned with the edges of the key slot 9 of the key plate 8. A further plate 14 is also attached to the vehicle and lies below the guide plate and above the housing 102A of the gear shift mechanism 102. This plate is slidably mounted and affixed to the rod 102F for movement therewith.

In order for the gear shift lever 6 to be able to move the pin 102E for releasing the latch 102C, the lever 6 is provided with its own spring mounted pin 15. The pin 15 extends through the shoulder 12 and rod 7 to the upper enlarged end 16 of the lever (see, FIG. 5). The end 16 is provided with a push button 17 which when pressed pushes the pin 15 downward.

With the gear shift lever attached to the adapter 11, the pin 15 aligns with the pin 102E in the rod 102F and its downward motion urges the pin 102E likewise downward. This releases the latch 102C, allowing rotation of the arm 102B via movement of the enlarged end 16 and rod 7 of the gear shift lever 6.

While the gear shift assembly 1 has been illustrated in terms of use with a floor mounted gear shift mechanism, the assembly can also be used with other types of mountings for the gear shift mechanism. FIGS. 6–10 show the assembly 1' utilized with a gear shift mechanism 51 mounted on the column 53 of a steering wheel 52. Again, in this case, the assembly 1' is such that the gear shift lever 6' can only be attached to and released from the gear shift mechanism 51 in the park position of the vehicle due to the positioning of the key plate 8' as above-described. Also, in this case, as shown schematically in FIG. 9, adapter 11' is secured over a shaft 54 of the gear shift mechanism 51 to provide the above-described double keyed relationship.

As also can be seen, the elongated portion 4B' of the slot 4' of the top plate 3' has transverse indentations 4C' to allow for usual shifting of the gear shift mechanism 51. The slot portion 9B' of the slot 9' of the key plate 8' (see FIG. 10) has like indentations 9C' for the same reason.

In the illustrated case of FIGS. 6–10, the rod 7' and end 16' of the lever 6' are solid and carry no pin, since the gear shift mechanism 51 is rotated to different gear positions merely by rotating the shaft 54. Additionally, as depicted, the end 5' of the lever 6 is connected directly to the rod 7' without the need of a shoulder 12 or a slot 5D.

Figure 11:
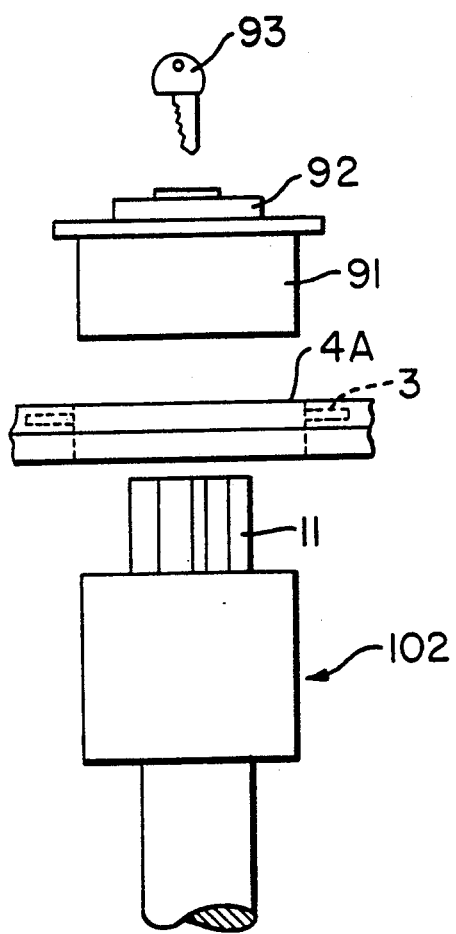
FIG. 11 shows a plug usable with the gear shift mechanism of FIG. 1 when the gear shift lever has been removed.

In order to provide added security to the gear shift mechanism 102 or 51 when the gear shift lever 6 is detached, a plug can be provided which plugs into the enlarged portion 4A of the housing slot 4. This is illustrated in FIG. 11 where plug 91 is insertable in the enlarged portion of the slot 4 of plate 3 of the housing 2. The plug can also be provided with a locking mechanism 92 which allows the plug to be locked in place in the slot 4A by using a suitable key 93.

In the above-described embodiments of the gear shift assembly 1, the end 5 of the gear shift lever 6 was fluted on its inner surface 5 to mate with the fluted exterior surface 11A of the adapter 11. The end 5 thus acted as a female connector and the adapter 11 as a male connector. However, it is also possible that the keyed engagement between the end 5 and the adapter 11 can be modified such that the end 5 acts a male connector and the adapter 11 as a female connector.

Figure 12:
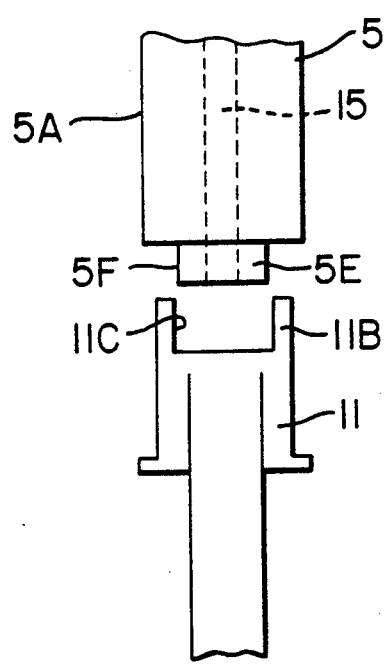
FIG. 12 illustrates a modified form of the end of the gear shift lever of FIG. 1.

A possible modification is illustrated in FIG. 12. In the illustrated case, the end 5 is solid and carries an extension piece 5E whose outer surface 5F has the third preselected configuration. The adapter 11 includes an upper cylindrical section 11B whose interior surface 11C has the fourth preselected configuration. As a result, the surface 5F of the extension piece 5E can mate with the surface 11C of the adapter 11 in keyed fashion.

It should be noted that the gear shift assembly 1 can be incorporated into vehicles during their original manufacture or can be incorporated into existing vehicles by suitable modification of the existing gear shift assemblies. In the particular case of the FIG. 1 embodiment, this shows the modification of a gear shift assembly of a Pontiac vehicle to incorporate the features of the invention.

Specifically, the original gear shift assembly included the upper elements (7, 15, 16 and 17) of the gear shift lever 6 and the rod 102F, latch 102C and pin 102E. The rod 7 and rod 102F were a single piece as were the pins 15 and 102E. The original assembly also included the housing 2, plates 13 and 14 and the gear shift mechanism 102.

This assembly was modified by splitting the single piece forming the rod 7 and rod 102F and the single piece forming the pins 102E and 15 into separate pieces and by then adding spring biasing to the pin 15. Also added were the end 5 and shoulder piece 12 to the rod 7, the adapter 11 to the rod 102F and the key plate 8 to complete the assembly 1 of the invention.

It is evident, therefore, that the gear shift assembly of the invention can be adapted to various vehicles by modifying existing parts and supplying additional parts to realized the desired assembly. Thus, the gear shift assembly 1 can be manufactured and sold in kit form including any needed added parts and instructions as to how to modify the existing assembly to incorporate the added parts to realize the gear shift assembly of the invention.

Additionally, while the gear shift lever assembly 1 of the invention has been shown in connection with use with gear shift mechanisms in which the mechanisms perform automatic shifting of the vehicle gears, the assembly 1 is equally useable with gear shift mechanisms which require the use of user operated clutch mechanisms for assisting in gear shifting. For such so-called "standard" gear shift mechanisms, the gear shift lever 6, key plate 8 and adapter 11 would be suitably modified to accommodate the particular gear shift mechanism and so as to permit releasable engagement with the gear shift mechanism in a gear shift position or positions in which the vehicle is not able to move under its own power. In the case of most vehicles which use standard gear shift mechanisms, this gear shift position would be the neutral position, since the standard gear shift mechanisms do not include a park position.

As a further feature of the gear shift assembly 1 of the invention, the assembly can be further adapted to include means which is able to cooperate with the electrical starting circuit of the vehicle so as to enable the starting circuit to start the vehicle only when the gear shift assembly is suitably affixed to or engaged with the gear shift mechanism. In the embodiment of the invention shown in FIG. 1, this is accomplished by including a pair of electrical contacts 11D on the flange 11B of the adapter 11 and a conductive washer 5G on the lower end 5 of the gear shift lever 6.

In this way, when the end of 5 of gear shift lever 6 is positioned on the adapter 11, the washer 5G of the lever provides an electrical connection between the contacts 11D. When the end 5 is removed from the adapter, the electrical connection is then broken. The combination of the washer 5G and contacts 11D thus act as a switch which is closed when the gear shift lever 6 is affixed to the adapter 11 and which is opened when the gear shift lever 6 is detached from the adapter.

Figure 13:
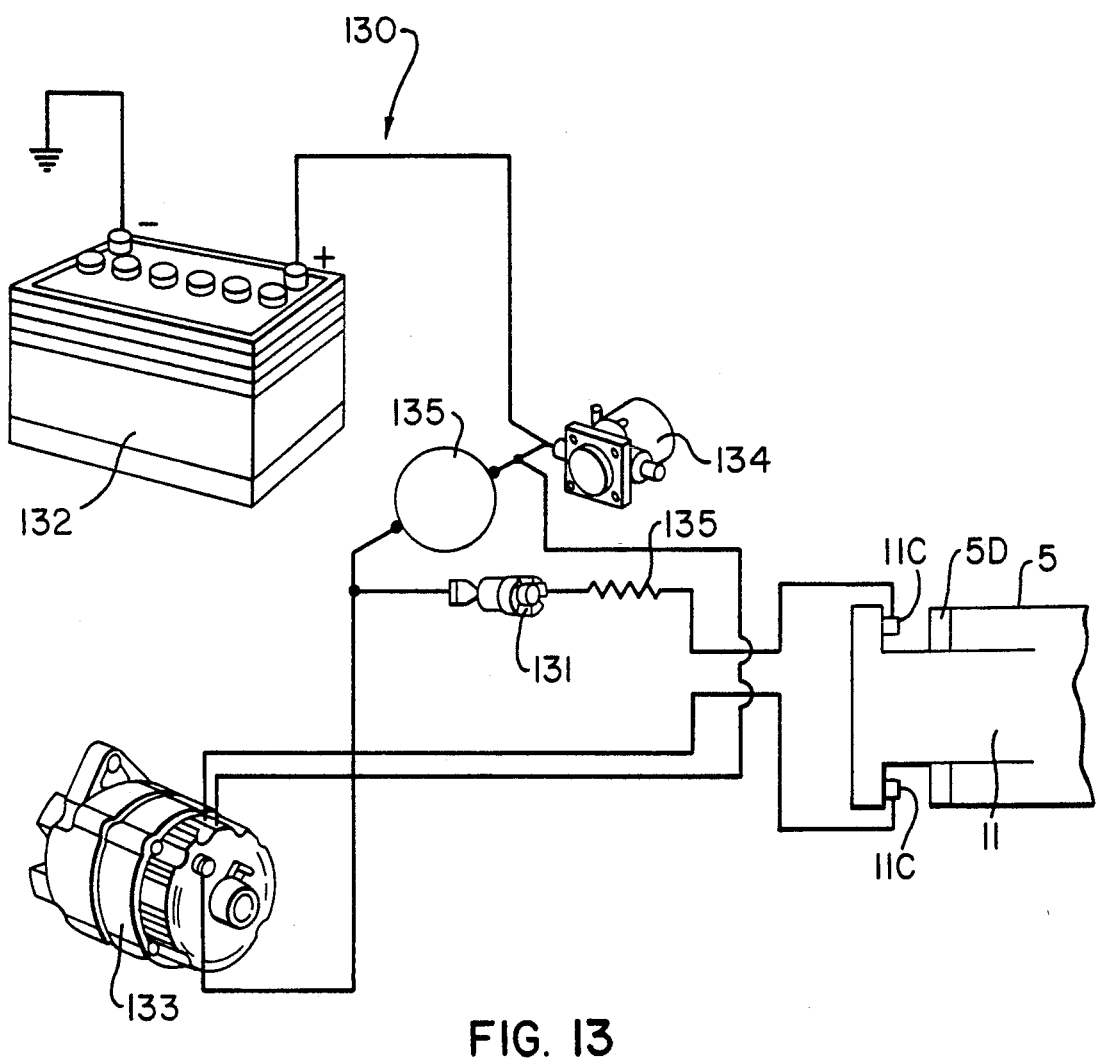
FIG. 13 shows portions of the gear shift lever assembly of FIG. 1 used as an electrical interlock in the starting system of a vehicle.

By incorporating this switch into the starting circuit of the vehicle 101 so that the switch inhibits or prevents the circuit from starting the vehicle 101 in the opened position of the switch (detached position of the lever 6 and adapter 11) and so that it permits the starting circuit to start the vehicle in the closed position of the switch (attached position of the lever 6 and adapter 11), the desired electrical interlock relationship is achieved. FIG. 13 shows a conventional starting and charging circuit 130 of the vehicle 101 with the switch defined by the contacts 11D and the washer 5G placed in series with the vehicle ignition switch 131. This results in the desired enabling and disabling of the starting circuits 130 as above-described.

In the FIG. 13 embodiment, the starting circuit 130 further comprises a battery 132, a starter 133, a solenoid 134 and a resistance wire 135. The circuit 130, in turn, supplies power to the armature 136 the vehicle 101.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention.

What we claim is:

1. A removable gear shift lever assembly for use by a vehicle operator in operating a vehicle having a gear shift mechanism, said gear shift mechanism having at least one position which allows the vehicle to move under its engine power and at least another position which does not allow the vehicle to move under its engine power, the assembly comprising:
a gear shift lever having a first end adapted to engage the gear shift control mechanism;
and means adapted to cooperate with said gear shift lever to permit said gear shift lever to be non-releasably maintained in engagement with said gear shift mechanism in all said positions of said gear shift mechanism in which said gear shift mechanism allows the vehicle to move under its own power and to be releasably maintained in engagement with said gear shift mechanism in at least one position in which said gear shift mechanism does not allow the vehicle to move under its own power.

2. A removable gear shift lever assembly in accordance with claim 1 wherein:
said one position is one of the park position and the neutral position of said gear shift mechanism.

3. A removable gear shift lever assembly in accordance with claim 2 wherein:
said means comprises a plate adapted to be mounted such that said first end of said gear shift lever must pass through said plate in order to be attached to and released from said gear shift mechanism, said plate having a slot adapted to allow passage of said gear shift lever through said plate in a first preselected position of said slot associated with said one position of said gear shift mechanism.

4. A removable gear shift lever assembly in accordance with claim 3 wherein:
an outer surface of said first end of said gear shift lever has a first preselected configuration;
and said slot at said first position has a second preselected configuration which is complimentary to said first preselected configuration.

5. A removable gear shift lever assembly in accordance with claim 4 wherein:
said slot at said first position is enlarged relative to the remaining portions of said slot.

6. A removable gear shift lever assembly in accordance with claim 4 wherein:
said first position is at an end of said slot.

7. A removable gear shift lever assembly in accordance with claim 4 further comprising;
a housing adapted to be placed over said gear shift mechanism, said housing supporting said plate and having a top surface provided with a slot aligned with the slot in said plate and being enlarged in area and aligned with said position of the slot in said plate to permit said first end of said gear shift lever to pass to said plate.

8. A removable gear shift lever assembly in accordance with claim 4 wherein:
said first end of said gear shift lever includes a part having a third preselected configuration;
and said gear shift lever assembly includes an adapter to be attached to said gear shift mechanism and having a fourth preselected configuration complimentary to said third preselected configuration such that said part of said gear shift lever can matingly engage said adapter.

9. A removable gear shift lever assembly in accordance with claim 8 wherein:
said first end of said gear shift lever assembly is tubular and said part of said first end includes the inner surface of said first end;
and an outer surface of said adapter has said fourth preselected configuration.

10. A removable gear shift lever assembly in accordance with claim 8 wherein:
said part of said first end of said gear shift lever includes an extension of said first end and the outer surface of said extension includes said third preselected configuration;
and an inner surface of said adapter has said fourth preselected configuration.

11. A removable gear shift lever assembly in accordance with claim 4 wherein:
said vehicle includes a starting circuit for starting said vehicle;
said adapter includes first and said second contracts;
said first end of said gear shift lever includes means for electrically connecting said first and second contacts when said part of said gear shift lever is matingly engaged with said adapter;
and said first and second contacts are adapted to be part of said electrical circuit of said vehicle so that when said contacts are electrically connected by said electrical connecting means of said gear shift lever said starting circuit is permitted to start said vehicle and when said contacts are not electrically connected by said electrical connecting means of said gear shift lever said starting circuit is not permitted to start said vehicle.

12. A removable gear shift lever assembly in accordance with claim 4 in which:
said first end above the surface having said first preselected configuration is slotted and includes a shoulder section above said slotted section which is of a greater diameter than the part of said first end whose surface has said first preselected configuration.

13. A removable gear shift lever assembly in accordance with claim 12 wherein:
said gear shift lever further includes a rod extending upward from said shoulder and a knob at the end of said rod.

14. A removable gear shift lever assembly in accordance with claim 1 wherein:
said vehicle includes a starting circuit for starting said vehicle;
and said removable gear shift lever assembly includes further means adapted to cooperate with said starting circuit to permit said starting circuit to start said vehicle when said first end of said gear shift lever is in engagement with said gear shift mechanism and to inhibit said starting circuit from being able to start said vehicle when said gear shift lever is disengaged from said gear shift mechanism.

15. A removable gear shift lever assembly in accordance with claim 14 wherein:
a part of said further means is attached to said first end of said gear shift lever.

16. A removable gear shift lever assembly in accordance with claim 1 wherein:
said gear shift mechanism is an automatic gear shift mechanism.

17. A removable gear shift lever assembly in accordance with claim 1 wherein:
said gear shift mechanism is a standard gear shift mechanism.

18. A removable gear shift lever assembly to be used with a gear shift mechanism of a vehicle and with a key plate through which the gear shift lever must pass to be attached to and released from the gear shift mechanism, the gear shift lever assembly including;
a gear shift lever having a first end, said first end having an outer surface of a first preselected configuration which is complimentary to a second preselected configuration at a position of a slot in said key plate and an interior part having a further surface of a third preselected configuration which is complimentary to a fourth preselected configuration of a part at which said gear shift lever is to be attached to said gear shift mechanism.

19. A removable gear shift lever assembly in accordance with claim 18 wherein:

said first end of said gear shift lever is tubular and the inner surface of said tubular first end comprises said further surface.

20. A removable gear shift lever assembly in accordance with claim 18 wherein:
said vehicle includes a starting circuit for starting said vehicle;
and said first end of said gear shift lever includes a part of a further means adapted to cooperate with said starting circuit to permit said starting circuit to start said vehicle when said first end of said gear shift lever is in engagement with said gear shift mechanism and to inhibit said starting circuit from being able to start said vehicle when said gear shift lever is disengaged from said gear shift mechanism.

21. A vehicle comprising:
a gear shift mechanism having at least one position which allows the vehicle to move under its own engine power and at least another position which does not allow the vehicle to move under its own engine power;
and a removable gear shift lever assembly comprising: a gear shift lever having a first end adapted to engage the gear shift mechanism; and means adapted to cooperate with said gear shift lever to permit said gear shift to be non-releasably maintained in engagement with said gear shift mechanism in all said positions of said gear shift mechanism in which said gear shift mechanism allows the vehicle to move under its own power and to be releasably maintained in engagement with said gear shift mechanism in at least one position in which said gear shift mechanism does not allow the vehicle to move under its own power.

22. A vehicle in accordance with claim 21 wherein: said gear shift mechanism is an automatic gear shift mechanism.

23. A vehicle in accordance with claim 22 wherein: said one position is one of the park position and the neutral position of said gear shift mechanism.

24. A vehicle in accordance with claim 21 wherein: said gear shift mechanism is a standard gear shift mechanism;

25. A vehicle in accordance with claim 24 wherein said one position is the neutral position of said gear shift mechanism.

26. A method for use with a vehicle having a gear shift mechanism, said gear shift mechanism having at least one position which allows the vehicle to move under its engine power and at least another position which does not allow the vehicle to move under its engine power, the method comprising:
bringing a first end of a gear shift lever into releasable engagement with a gear shift mechanism in a least one position of said gear shift mechanism in which said gear shift mechanism does not allow the vehicle to move under its own power;
and preventing said gear shift lever from being allowed to become disengaged from said gear shift mechanism in all said positions of said gear shift mechanism in which said gear shift mechanism allows the vehicle to move under its own power.

27. A method in accordance with claim 26 further comprising:
releasing said gear shift lever from engagement with said gear shift mechanism at said one position.

28. A method in accordance with claim 27 wherein: one position is one of the park position and the neutral position of said gear shift mechanism.

* * * * *

UNITED STATES PATENT AND TRADEMARK OFFICE
CERTIFICATE OF CORRECTION

PATENT NO. : 5,211,078
DATED : May 18, 1993
INVENTOR(S) : William D. McCarthy and Kevin P. Boydston It is certified that error appears in the above-identified patent and that said Letters Patent is hereby corrected as shown below:

Col. 1, line 10.  After "attempt" insert -- to --
    Col. 2, line 13.  After "in" insert -- the --
    Col. 6, line 63.  Change "6" to -- 6' --
    Col. 7, line 9.   Change "5" to -- 5B --
    Col. 7, line 14.  After "acts" insert -- as --
    Col. 7, line 49.  Change "realized" to -- realize --
    Col. 8, line 41.  After "136" insert -- of --

Signed and Sealed this

First Day of February, 1994

Attest:

BRUCE LEHMAN

*Attesting Officer*   Commissioner of Patents and Trademarks